US010360644B2

(12) United States Patent
Posse et al.

(10) Patent No.: US 10,360,644 B2
(45) Date of Patent: *Jul. 23, 2019

(54) USER CHARACTERISTICS-BASED SPONSORED COMPANY POSTINGS

(71) Applicant: Microsoft Technology Licensing, LLC, Redmond, WA (US)

(72) Inventors: Christian Posse, Forster City, CA (US); Michael Grishaver, Portola Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,606

(22) Filed: Dec. 20, 2017

(65) Prior Publication Data

US 2018/0225776 A1 Aug. 9, 2018

Related U.S. Application Data

(63) Continuation of application No. 14/676,525, filed on Apr. 1, 2015, now Pat. No. 9,881,344, which is a continuation of application No. 13/679,807, filed on Nov. 16, 2012, now Pat. No. 9,105,069.

(51) Int. Cl.
*G06Q 50/00* (2012.01)
*G06Q 30/02* (2012.01)

(52) U.S. Cl.
CPC ......... *G06Q 50/01* (2013.01); *G06Q 30/0234* (2013.01); *G06Q 30/0269* (2013.01); *G06Q 30/0275* (2013.01)

(58) Field of Classification Search
CPC ... G06Q 10/10; H04L 29/06; H04L 29/08072; H04L 29/06027; H04L 12/581
See application file for complete search history.

(56) References Cited

U.S. PATENT DOCUMENTS

| 9,105,069 B2 | 8/2015 | Posse et al. |
| 9,881,344 B2 | 1/2018 | Posse et al. |
| 2008/0114672 A1 | 5/2008 | Yahia et al. |
| 2009/0299993 A1 | 12/2009 | Novack |
| 2011/0238496 A1 | 9/2011 | Gurbuxani et al. |
| 2014/0129326 A1 | 5/2014 | Munitz |
| 2014/0143323 A1 | 5/2014 | Posse et al. |
| 2015/0206193 A1 | 7/2015 | Posse et al. |

OTHER PUBLICATIONS

"U.S. Appl. No 13/679,807, Amendment Under 37 C.F.R. filed Jun. 22, 2015", 7 pgs.

(Continued)

*Primary Examiner* — Dady Chery
(74) *Attorney, Agent, or Firm* — Schwegman Lundberg & Woessner, P.A.

(57) ABSTRACT

A system may include a network interface, a user interface, and a recommendation engine. The user interface may be configured to receive a company characteristic of a company profile of a company posted to the social network and a company bid from an entity related to company to the social network. The recommendation engine may be configured to determine an aggregate company score for the user based on a relevance of the company characteristic to a user characteristic and the company bid. The network interface may be configured to transmit a message related to the company to the user based, at least in part, on the aggregate company score.

20 Claims, 10 Drawing Sheets

(56) References Cited

OTHER PUBLICATIONS

"U.S. Appl. No. 13/679,807, Non Final Office Action dated Oct. 22, 2014", 7 pgs.
"U.S. Appl. No. 13/679,807, Notice of Allowance dated Mar. 23, 2015", 5 pgs.
"U.S. Appl. No. 13/679,807, PTO Response to Rule 312 Communication dated Jul. 8, 2015", 2 pgs.
"U.S. Appl. No. 13/679,807, Response filed Feb. 23, 2015 to Non-Final Office Action dated Oct. 22, 2014", 8 pgs.
"U.S. Appl. No. 14/675,525, Response filed Sep. 16, 2015 to Non Final Office Action dated Jun. 18, 2015", 11 pgs.
"U.S. Appl. No. 14/676,525, Final Office Action dated Jun. 16, 2016", 16 pgs.
"U.S. Appl. No. 14/676,525, Non Final Office Action dated Jan. 13, 2017", 6 pgs.
"U.S. Appl. No. 14/676,525, Non Final Office Action dated Jun. 18, 2015", 7 pgs.
"U.S. Appl. No. 14/676,525, Non Final Office Action dated Nov. 24, 2015", 15 pgs.
"U.S. Appl. No. 14/676,525, Notice of Allowance dated Sep. 26, 2017", 5 pgs.
"U.S. Appl. No. 14/676,525, Response filed Mar. 24, 2016 to Non Final Office Action dated Nov. 24, 2015", 17 pgs.
"U.S. Appl. No. 14/676,525, Response filed Apr. 13, 2017 to Non Final Office Action dated Jan. 13, 2017", 11 pgs.
"U.S. Appl. No. 14/676,525, Response filed Dec. 16, 2016 to Final Office Action dated Jun. 16, 2016", 13 pgs.
"U.S. Appl. No. 14/676,525, Examiner Interview Summary dated Aug. 31, 2015", 3 pgs.

USER CHARACTERISTICS-BASED SPONSORED COMPANY POSTINGS

RELATED APPLICATIONS

This application is a Continuation of U.S. patent application Ser. No. 14/676,525, filed Apr. 1, 2015, which is a Continuation of U.S. patent application Ser. No. 13/679,807, filed Nov. 16, 2012 and issued on Aug. 11, 2015 as U.S. Pat. No. 9,105,069, both of which are incorporated herein by reference in their entireties.

TECHNICAL FIELD

The subject matter disclosed herein generally relates to the presentation of sponsored company messages to users of a social network based on a company profile and a user characteristic.

BACKGROUND

Various organizations, such as companies, clubs, societies, groups, and the like (herein after referred to collectively and without limitation as "companies") often create postings in various media entities to advertise the company, such as to create awareness of the company and its products, opinions, positions, and so forth. Company postings have been incorporated into newspapers, periodicals, and the like for centuries. More recently, search engines and websites related to facilitating searching have presented such company postings electronically. In such circumstances, companies conventionally pay a fee to the owner of the platform on which the advertisement is to be displayed. As a result, advertisements may conventionally be displayed generally to most if not all of the users who access the platform.

BRIEF DESCRIPTION OF THE DRAWINGS

Some embodiments are illustrated by way of example and not limitation in the figures of the accompanying drawings.

DETAILED DESCRIPTION

Example methods and systems are directed to generation of user profile-based sponsored company postings. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

While broad dissemination of a company posting may be desirable in certain circumstances, it may be inefficient for a company-posting entity to pay to display postings to users who are uninterested or not in a target demographic for the company or otherwise not desirable to the company. Similarly, it may be inefficient or undesirable for a user to receive sponsored company postings that are unrelated to their field of expertise or interests. A system has been developed that displays company postings to users of a social network based on user characteristics, such as the user's social network profile, the user's behavior or activities, and the user's social graph, such as people, companies, and groups that the user has connected with, follows, or joins within the social network. In this way, a user may seamlessly receive pertinent company postings based on their prior social network activity. Relatedly, companies may sponsor company postings on the social network or on a platform with access to the user's social network characteristics with the increased expectation that the expense of sponsoring a company posting may be relatively more likely to result in the company posting being presented to a user with suitable characteristics.

Figure 1:
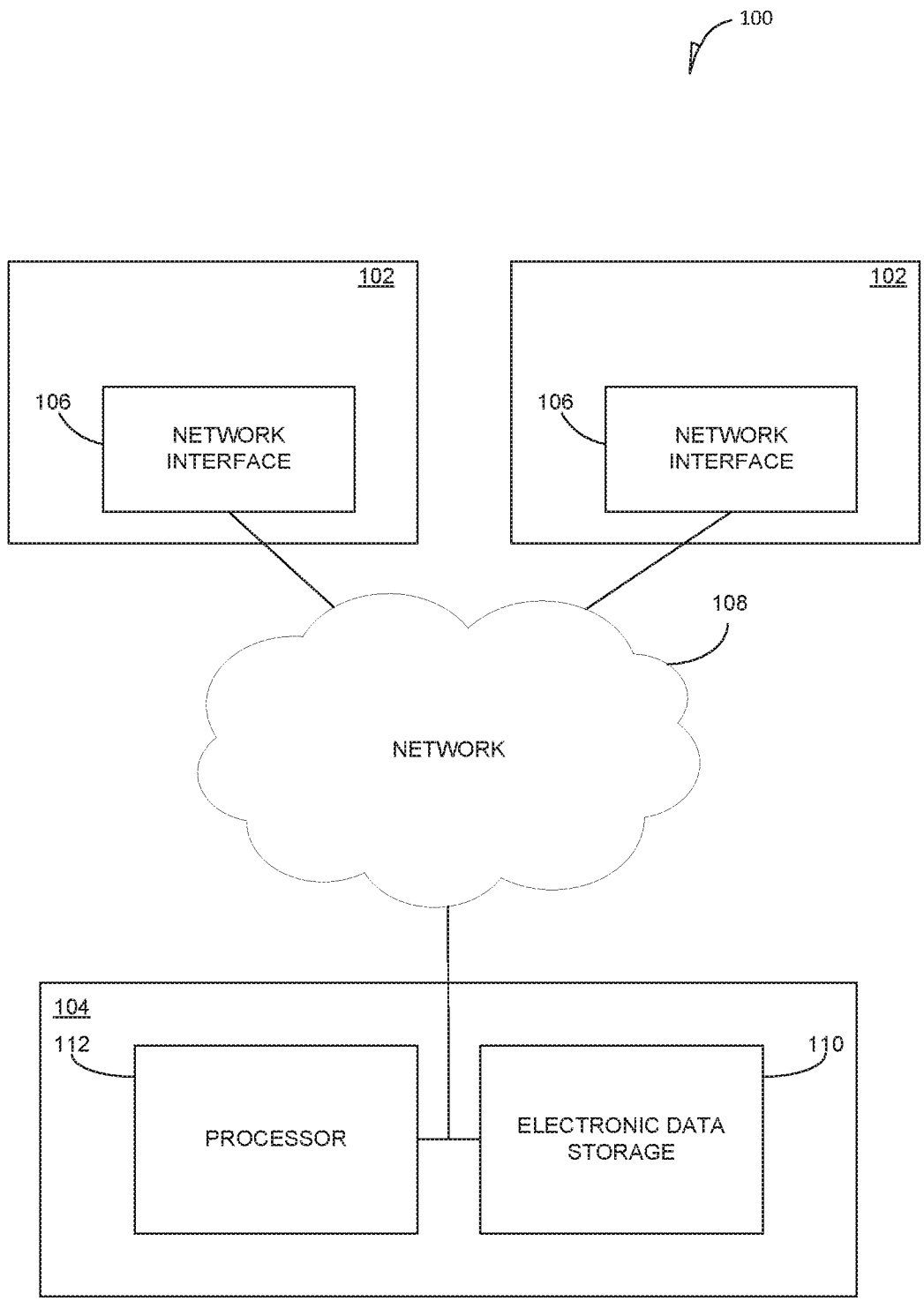
FIG. 1 is a block diagram of a system including user devices and a social network server.

FIG. 1 is a block diagram of a system 100 including user devices 102 and a social network server 104. User devices 102 can be a personal computer, netbook, electronic notebook, smartphone, or any electronic device known in the art that is configured to display web pages. The user devices 102 can include a network interface 106 that is communicatively coupled to a network 108, such as the Internet.

The social network server 104 can be communicatively coupled to the network 108. The server 104 can be an individual server or a cluster of servers, and can be configured to perform activities related to serving the social network, such as storing social network information, processing social network information according to scripts and software applications, transmitting information to present social network information to users of the social network, and receive information from users of the social network. The server 104 can include one or more electronic data storage devices 110, such as a hard drive, and can include a processor 112.

The social network server 104 can store information in the electronic data storage device 110 related to users of the social network, such as in the form of user characteristics corresponding to individual users of the social network. For instance, for an individual user, the user's characteristics can include one or more profile data points, including, for instance, name, age, gender, profession, prior work history or experience, educational achievement, location, citizenship status, leisure activities, likes and dislikes, and so forth. The user's characteristics can further include behavior or activities within and without the social network, as well as the user's social graph. For a company, the information can include name, offered products for sale and details of such products, organizational interests, forthcoming activities, and the like.

User characteristics described above can generally include user profile characteristics, in that they are typically defined by a single discrete label, such as a number, a place, or a binary status. Characteristics included in user behavior, such as can be identified based on user activity within the social network generally. For instance, a user who searches company websites, searches for company information, such as by entering company keywords into a search engine either of the social network or independent of the social network, and who "likes" or otherwise indicates approval of company products and services can be deemed to have characteristics such as being interested in the company or in particular products and services of the company. Additional user behavior or activities, such as messages to company personnel and job applications filled out or submitted can also be incorporated. As such, user actions both within and without the social network can be utilized to determine user characteristics such as user behavior.

Activity and behavioral data can be obtained by monitoring and tracking the interactions that a user has with various applications, services and/or content that are provided by, or, integrated or otherwise associated with, the social network service. For example, a social network service may provide any number and variety of applications and/or services with which a member interacts. Similarly, a variety of third-party applications and services may leverage various aspects of the social network service, for example, via one or more application programming interfaces (APIs). A few examples of such applications or services include: search engine applications and services, content sharing and recommendation applications (e.g., photos, videos, music, hyperlinks, slideshow presentations, articles, etc.), calendar management applications and services, contact management and address book applications and services, travel and itinerary planning applications and services, and many more.

Analysis of social graph data may signal a member's interest in various companies and their products and services. For instance, in some examples, by analyzing certain social graph data, characteristics can be identified that are suggestive of company interest. For example, members who are actively seeking company information may be more likely to follow other members of the social network service, or establish new connections with other members in a very concentrated or shortened time span—particularly other members who are affiliated with the company. Similarly, members who are actively seeking companies or products of a particular type may be more likely to follow certain related or otherwise similar companies. Members who are actively seeking particular company types may be more likely to join certain online groups—particularly those groups that exist primarily to provide company or product information. Accordingly, by analyzing social graph data to identify the entities with which a member is establishing associations or connections, and the timing and frequency of the activity, the company- or product-interest of a member may be inferred, and used in the derivation of a metric representing the member's company interest.

In various embodiments, the system 100 includes logic that can identify user profiles that conform to a given company profile. In various examples, upon receiving a request to identify user profiles similar to a particular company profile, the system may analyze a variety of user profiles to select one or more user profiles that have the highest aggregate company scores with respect to the company profile. The identification can be in real-time, understood to be an analysis that is conducted essentially immediately upon receiving the company profile. After identifying the most similar user profiles (e.g., those with the highest aggregate company scores), the system 100 may transmit information related to the company to the selected users.

In various examples, the system 100 can generate a list of user characteristics with the highest aggregate company scores. The list can be presented to the entity posting the company message, such as a marketing specialist. The marketing specialist can identify users who have user characteristics that are desirable for contacting and manually select users of the social network to whom a message relating to the company can or should be presented.

In various examples, a recommendation service or feature may generate an average user characteristic based on the aggregate user characteristic information of all or some selected users for a particular company. For instance, the recommendation service may select the average user characteristic as an input to the user characteristic matching algorithm, and identify user characteristics that are similar to the model company profile for the company profile. For each user characteristic that is determined to be similar to the average user characteristic for a particular company profile, the recommendation service may recommend to a user having user characteristics similar to the company profile for the instant company, that the user be presented with a message related to the company if the user has not already been so presented.

The ability to accurately identify in real-time or essentially real-time a set of user characteristics most similar to a company profile (or, in various examples, a set of company profiles most similar to user characteristics) can be achieved with a general recommendation engine. Accordingly, at least in some examples, the recommendation engine provides a recommendation service that can be customized for use with multiple applications or services. A recommendation entity can be a collection of information organized around a particular concept that is supported by the system 100 in general, and the recommendation engine in particular. For instance, some examples of recommendation entities are: user characteristics, interest groups, companies, advertisements, events, news, discussions, tweets, questions and answers, and so forth. Accordingly, in some examples, by specifying the particular characteristics of two recommendation entities to be compared, and by specifying a particular algorithm for use in generating an aggregate score, such as in this instant example an aggregate company score, for the two recommendation entities, the recommendation engine can be configured and customized to perform such tasks as: generate aggregate company scores for use in recommending company listings to a user; generate aggregate company scores for use in recommending particular interest groups that a user might be interested in joining; generate aggregate company scores for use in displaying an appropriate or relevant advertisement to a particular user, and many others.

In an example, the recommendation engine operates in two phases. In the first phase, the data representing each individual instance of a particular recommendation entity, such as the user characteristics and the company profile, is processed by a characteristic extraction engine to extract the relevant characteristics on which matching analysis is to be performed. In various examples, in the case of a user profile, only certain characteristics or portions of a user's profile may be selected for use in determining the similarity of any two profiles, such as the user profile and a company profile. As such, during the first phase, a characteristic extraction engine processes each user profile to extract the relevant profile characteristics from each user profile, along with behavior characteristics and social graph characteristics. In addition to simply extracting certain characteristics from relevant recommendation entities, the characteristic extraction engine may derive certain characteristics based on other information included in the recommendation entity, such as from the user profile.

In an example, characteristics that may be used to identify similarities between a user characteristic and a company profile is job title, interests, and consumer goods that the user likes. In addition, in some examples, the characteristic extraction engine may standardize and/or normalize various characteristics, such as a user's company or position title, or the name of a company at which a user has indicated being employed. In some examples, certain profile characteristics may be retrieved from external data sources, using other information included in the recommendation entity as part of a query to the external data source.

The first phase may occur in real-time or as a background operation, such as offline or as part of a batch process. In some examples that incorporate relatively large amounts of data to be processed, the first phase may be achieved via a parallel or distributed computing platform. Once the relevant characteristics have been extracted, computed, derived, or retrieved, relevant characteristics of the users or companies can be stored as a pre-processed recommendation entity. For instance, in the case of user characteristics, the characteristic extraction process can result in enhanced user characteristics that include only the relevant characteristics extracted from a user's characteristics as well as any derived or retrieved characteristics, such as profile characteristics. The enhanced characteristics can be used during the recommendation engine's second phase, when the matching engine compares the relevant profile characteristics from the company profile against each user characteristic set until those user characteristics with the highest aggregate company scores are identified.

In an example, during the second phase, the matching engine of the recommendation engine uses a configuration file that is customized for the particular analysis being performed. For example, a first configuration file (referred to herein as a profile matching configuration file) may exist for use in identifying user profiles similar to a company profile, whereas a second configuration file—specifying different characteristics from different recommendation entities to be compared, and a different algorithm for computing the matching scores—may be specified for determining the company listings that are most likely to be of interest to a particular user. As such, by configuring the characteristic extraction engine to extract relevant data from certain recommendation entities, and customizing the analysis performed by the matching engine with an appropriate configuration file, a wide variety of recommendation operations can be achieved with the general recommendation engine.

Figure 2:
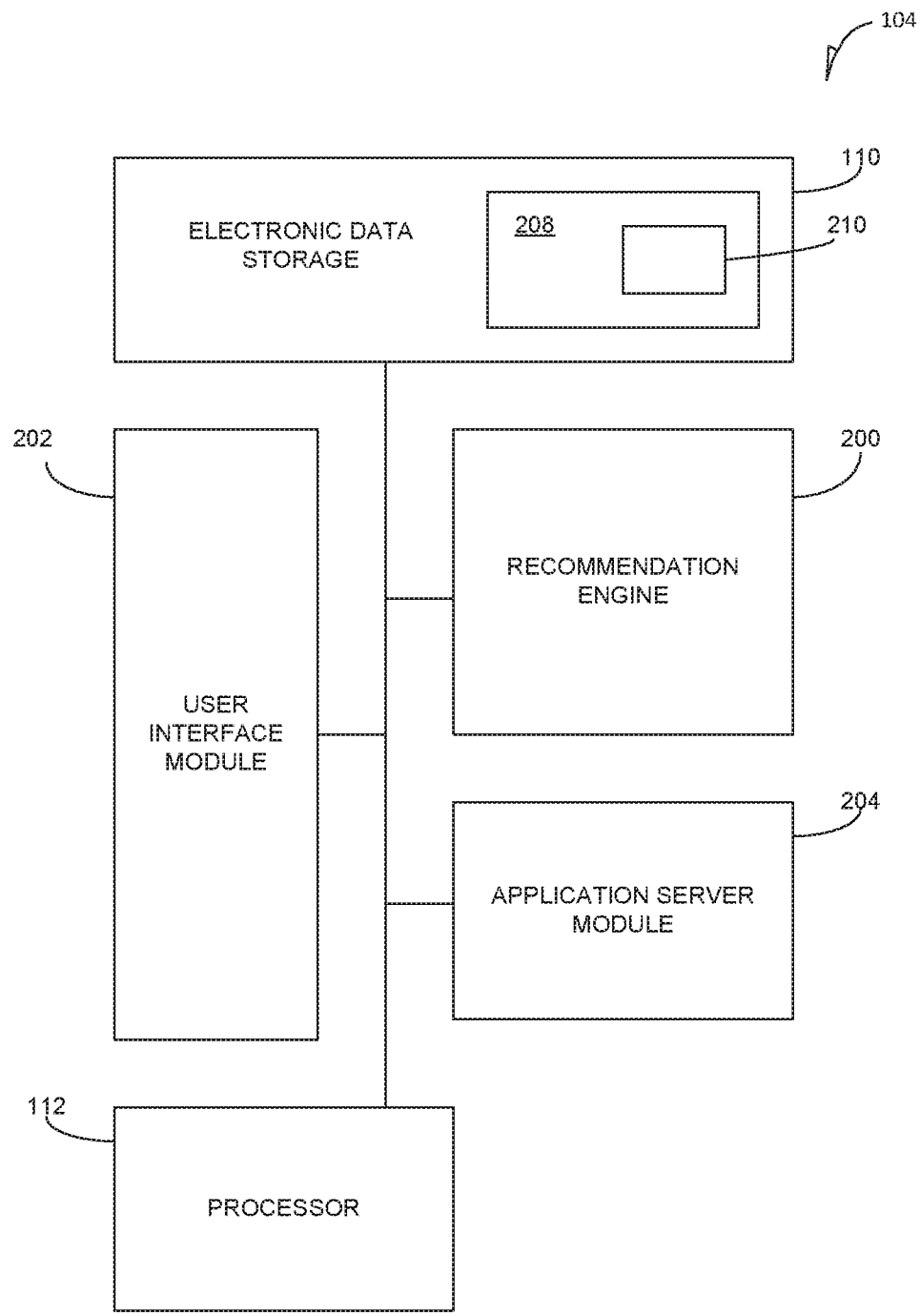
FIG. 2 is a block diagram illustrating various components of a social networking server with a recommendation engine.

FIG. 2 is a block diagram illustrating various components of a social networking server 104 with a recommendation engine 200 for identifying similarities between different recommendation entity types, such as user characteristics and company profiles. In an example, the social networking server 104 is based on a three-tiered architecture, consisting of a front-end layer, application logic layer, and data layer. As is understood by skilled artisans in the relevant computer and Internet-related arts, each module or engine shown in FIG. 2 can represent a set of executable software instructions and the corresponding hardware (e.g., memory and processor) for executing the instructions. To avoid obscuring the subject matter with unnecessary detail, various functional modules and engines that are not germane to conveying an understanding of the inventive subject matter have been omitted from FIG. 2. However, a skilled artisan will readily recognize that various additional functional modules and engines may be used with a social networking server 104 such as that illustrated in FIG. 2, to facilitate additional functionality that is not specifically described herein. Furthermore, the various functional modules and engines depicted in FIG. 2 may reside on a single server computer, or may be distributed across several server computers in various arrangements.

The front end of the social network server 104 consists of a user interface module (e.g., a web server) 202, which receives requests from various client computing devices, and communicates appropriate responses to the requesting client devices. For example, the user interface module(s) 202 may receive requests in the form of Hypertext Transport Protocol (HTTP) requests, or other web-based, application programming interface (API) requests. The application logic layer includes various application server modules 204, which, in conjunction with the user interface module(s) 200, generates various user interfaces (e.g., web pages) with data retrieved from various data sources in the data layer. With some embodiments, individual application server modules 204 are used to implement the functionality associated with various services and features of the system 100. For instance, the ability to identify user characteristics similar to a company may be a service implemented in an independent application server module 204. Similarly, other applications or services that utilize the recommendation engine 200 may be embodied in their own application server modules 204.

The data layer can include several databases, such as a database 208 for storing recommendation data, such as user characteristics and company profiles, and can further include additional social network information, such as interest groups, companies, advertisements, events, news, discussions, tweets, questions and answers, and so forth. In some examples, the recommendation entity data is processed in the background (e.g., offline) to generated pre-processed entity data, that can be used by the recommendation engine, in real-time, to make recommendations generally, and to identify user profiles similar to a company profile. In an example, the recommendation engine 200 may retrieve and process user characteristic data 210, including a user profile, user behavior, and a user social graph, in the database 208 to identify user characteristics similar to a company profile. The database 208 can store application configuration data, including one or more configuration files for use with the recommendation engine 200.

In various examples, when a person initially registers to become a user of the system 100, the person can be prompted to provide some personal characteristics, such as his or her name, age (such as by birth date), gender, interests, contact information, home town, address, the names of the user's spouse and/or family users, educational background (such as schools, majors, etc.), employment history, skills, professional organizations, and so on. This information can be stored, for example, in the database 208.

Once registered, a user may invite other user, or be invited by other users, to connect via the system 100. A "connection" may involve a bi-lateral agreement by the users, such that both users acknowledge the establishment of the connection. Similarly, with some embodiments, a user may elect to "follow" another user. In contrast to establishing a "connection", the concept of "following" another user typically is a unilateral operation, in some examples, does not require acknowledgement or approval by the user that is being followed. When one user follows another, the user who is following may receive automatic notifications about various activities undertaken by the user being followed.

The system 100 may provide a broad range of other applications and services that allow user the opportunity to share and receive information, often customized to the interests of the user. In some examples, the system 100 may include a photo sharing application that allows users to upload and share photos with other users. In some examples, users may be able to self-organize into groups, or interest groups, organized around a subject matter or topic of interest. With some embodiments, users may subscribe to or join groups affiliated with one or more companies. For instance, with some embodiments, users of the system 100 may indicate an affiliation with a company at which they are employed, such that news and events pertaining to the company are automatically communicated to the users. In some examples, users may be allowed to subscribe to receive information concerning companies other than the company with which they are employed. With many of these applications and services, one or more recommendation entities may be involved. For instance, in addition to identifying user characteristics that are similar to a company profile, the recommendation engine 200 may be configured and customized to identify groups, companies or photos that are likely to be of interest to a particular user.

Figure 3:
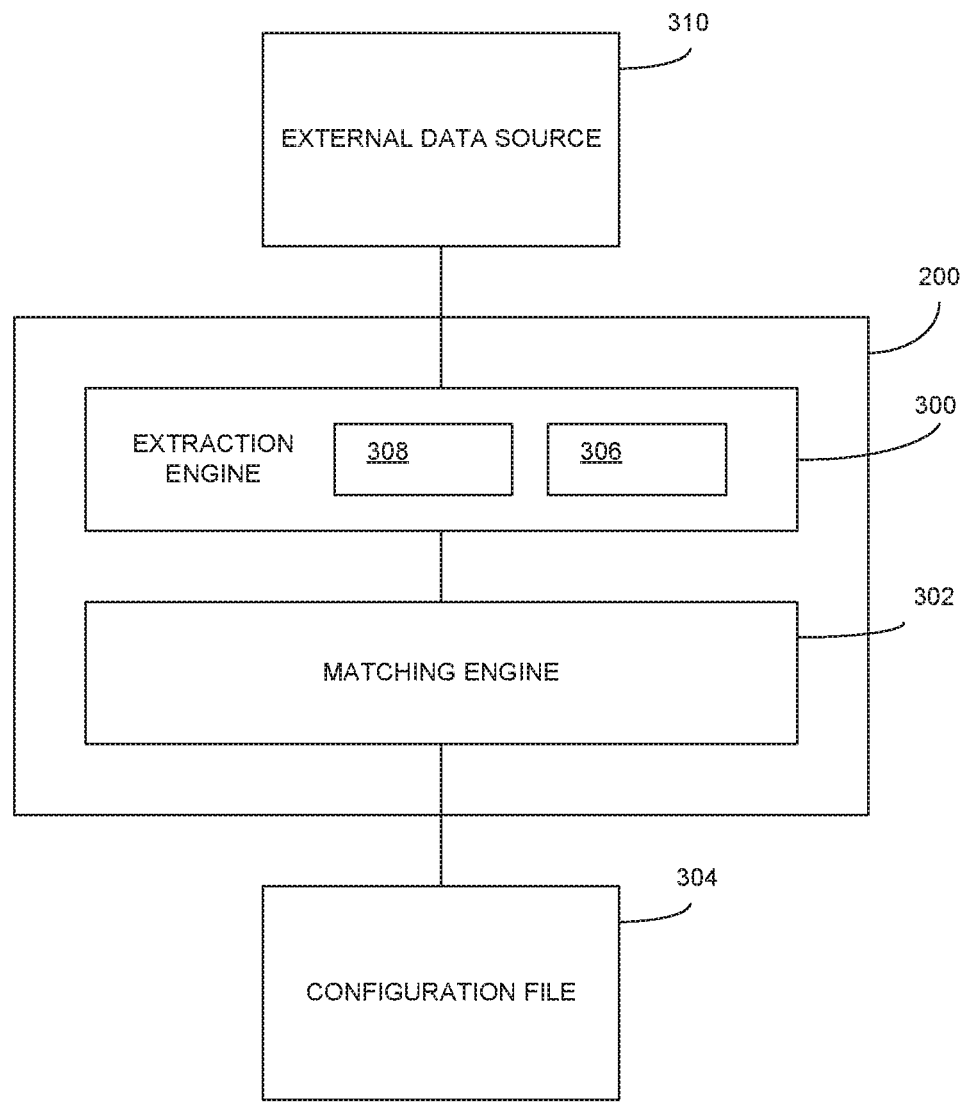
FIG. 3 is a block diagram showing some of the functional components or modules that comprise a recommendation engine.

FIG. 3 is a block diagram showing some of the functional components or modules that comprise a recommendation engine 200, in some examples, and illustrates the flow of data that occurs when performing various operations of a method for identifying and presenting user characteristics, such as profile characteristics, that are similar to a company profile. As illustrated, the recommendation engine 200 consists of two primary functional modules—a characteristic extraction engine 300 and a matching engine 302. The characteristic extraction engine 302 can be customized to extract various characteristics from various recommendation entities, and then operating the matching engine 302 under the direction of a particular configuration file 304 to perform a particular type of matching operation that is specific to the requesting application. Accordingly, depending upon the particular inputs to the recommendation engine 200 and the desired outputs, different configuration files 304 may be used to compare different characteristics of different recommendation entities. For instance, to identify user characteristics that are similar to a company profile, a particular configuration file 304 (referred to herein as a profile matching configuration file) may be used, while different configuration files 304 may be used to perform other tasks, such as identify companies that a user may be interested in.

In the case of identifying user characteristics similar to a company profile, the profile matching configuration file 304 is used as an input to the matching engine 302 to specify the various user characteristics that the matching engine is to extract from the pre-processed user profile data 210 and to compare. In addition, the profile matching configuration file 304 can specify an algorithm for comparing characteristics and generating an overall matching score.

In various examples, each user's and company's data 210 is provided as input to the characteristic extraction engine 300, processed by the characteristic extraction engine 300, and then output and stored as pre-processed user characteristic data 210. In some examples, the characteristic extraction engine 300 may extract only relevant characteristics from whatever recommendation entity is being processed by the characteristic extraction engine. So, for example, in the case of a user profile, the characteristic extraction engine 300 may extract only the profile characteristics that are necessary for making the determination of whether a user profile is similar to a company profile. However, in some examples, all characteristics are extracted, while only certain characteristics are further processed or refined.

As illustrated, the characteristic extraction engine 300 includes a characteristic derivation module 306 and a data retrieval module 308. In some examples, the characteristic derivation module 306 derives certain characteristics (e.g., profile characteristics, behavior characteristics, and social network characteristics) based on the data input to the characteristic extraction engine. For instance, in the case of user profiles, the characteristic derivation module 306 may derive one or more profile characteristics from the information included in a user's profile. Additional user characteristics, such as behavior and social network, may also be derived in this way. Similarly, the data retrieval module 308 may utilize information input to the characteristic extraction engine 300 to formulate a query that is communicated to an external data source 310. As such, the data retrieval module 308 of the characteristic extraction engine 300 can retrieve various profile characteristics from one or more external data sources, such that these retrieved profile characteristics can be used to determine the similarity of any two user profiles.

In addition to deriving various characteristics, and retrieving various characteristics, the characteristic extraction engine 300 can include logic to normalize or standardize certain characteristics, such as profile characteristics. For instance, in some examples, a user may be prompted to provide his or her job title. Because job titles can vary from one company to the next, and from one industry to the next, job titles may be normalized or standardized. For example, the simple job title "analyst" may have very different meanings in different industries. By normalizing and/or standardizing the job titles and then writing the standardized and normalized job titles to each user's enhanced characteristics, the ability of the recommendation engine to make effective comparisons may be enhanced, and thereby provide relatively accurate results when presenting user characteristics, such as a user profile, similar to a company profile.

After the characteristic extraction engine 300 has generated the pre-processed user characteristics data 210, the matching engine 302 is able to process client requests to identify user characteristics similar to a company profile. In some examples, the client of the matching engine 302 may simply be a server-side application that is requesting the information from the matching engine 302. Accordingly, the requesting application may specify or determine the particular configuration file that is to be used by the matching engine 302 to perform the requested task and achieve the requested objective. When a request is received at the matching engine 302 to provide a list of user characteristics similar to a company profile, the matching engine 302 can use the profile matching configuration file 304 to determine the particular user characteristics that are to be retrieved from the various enhanced user profiles. In addition, in various examples, the profile matching configuration file 304 can specify the exact comparisons that are to be performed, and how the overall matching score is to be calculated. Accordingly, the particular profile matching configuration file 304 can include instructions or directives for use by the matching engine 302 to perform the necessary characteristic comparisons, and to generate the aggregate company scores for each user characteristic set, such that the aggregate company score for each user characteristic data indicates the similarity of the user characteristics with respect to the company profile.

In some examples, the matching engine 302 can compare multiple individual characteristics such that each compared characteristic results in an aggregate company score (referred to herein as a sub-score, to reflect that the sub-score is a component of the overall aggregate company score). Once each sub-score is determined, the sub-scores are combined in some manner indicated by the profile matching configuration file 304. That is, the profile matching configuration file 304 may dictate how the matching engine 302 is to weigh and combine the individual similarity sub-scores to derive the overall aggregate company score for various user characteristics.

Figure 4:
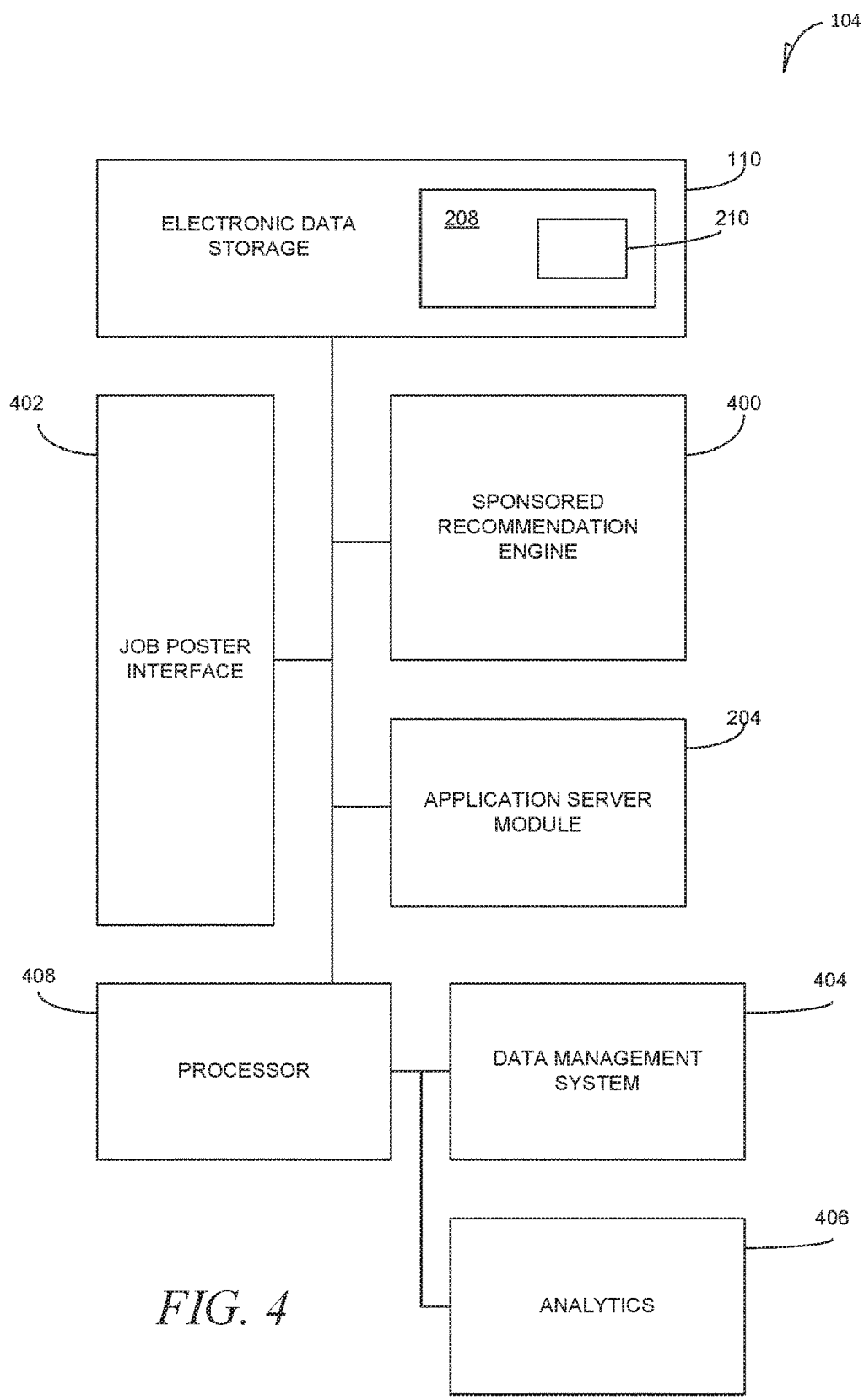
FIG. 4 is a detailed example of the social network server.

FIG. 4 is a detailed example of the social network server 104. The social network server 104 includes a sponsored recommendation engine 400. The sponsored recommendation engine can incorporate the recommendation engine 200 or can be an adapted form of the recommendation engine 200. In various examples, the sponsored recommendation engine 400 includes characteristics comparison between user characteristics and company profiles, and further factors a company bid associated with the company profile. A company bid can correspond to a cost incurred by the company-posting entity to present the company posting to relevant users of the social network.

The server 104 can include a company poster interface 402, such as with a user interface coupled to the server 104 or via the network interface 106. The user interface can include a conventional keyboard and display configuration well known in the art. The company poster interface 402 provides an interface for the posting of companies, including a corresponding company profile, on the social network and an ability to enter company bids for posted companies. Such interaction by the company poster can cumulatively be referred to as a "campaign."

The company poster interface 402 is coupled to a data management system 404. The data management system 404 can incorporate data management technologies well known in the art or can incorporate proprietary data management structures. In an example, the data management system 404 incorporates SAS or Statistical Analysis System data management systems, to promote business analysis, statistical analysis, data storage and recover, and the like for company information. The data management system 404 can include the capacity for social network administrators to utilize the data generated by the data management system 404, such as by inputting tasks into the data management system 404.

The company poster interface 402 and the data management system 404 can both be coupled to the database 208. The company poster interface 402 can transmit company data, such as company profiles and company bids, to the database 208 for storage without respect to data management activities. The data management system 404 can store company data in the database 208 upon the company data having been acted upon for data management analysis.

The network interface 106 can provide the input of user data, such as user characteristics, into the social network. The user characteristics can be stored in the database 208 or can be directly transmitted to the sponsored recommendation engine 400 for cross reference against the company profiles stored in the database 208. Companies identified by the sponsored recommendation engine 400 can be transmitted via the network interface 106 to the user device 102 for presentation to the user.

A sponsored company analytics system 406 can track the occurrence of company messages that have been presented to or selected by a user. A company message can be selected by a user, for instance, when a user selects or "clicks" on a corresponding web link that leads, for instance, to a company webpage. Bids by company posting entities can be based on a fixed number of occurrences that a sponsored company is presented to or selected by a user. In an illustrative example, a campaign may include a limit of one thousand (1,000) user selections for two (2) dollars per user selection. The sponsored company analytics system 406 can track how many times a company has been presented, how many times a company has been selected or "clicked" on by a user, bill a company presenting entity accordingly, and adjust the remaining number of times the company has left to be presented or selected accordingly.

Various campaigns can specify various limitations or lack thereof. A campaign can include an absolute maximum of clicks that will be sponsored or no limit. A campaign may specify a campaign time limit of hours, days, or longer, or no time limit. The sponsored company analytics system 406 can operate campaigns as auctions, such as by adjusting bids for a campaign within a range of bids based on the number of user selections the company posting has received; many selections may result in a lowered bid while few selections may result in a higher bid. A campaign may specify a campaign limit of monetary expenditure.

The sponsored company analytics system 406 can further monitor which companies are posted to users to seek to prevent sponsored company postings from being duplicated to a single user, as well as record analytical information related to the number of times, for instance, that a presented company has been clicked on by a user and the user characteristics of users who have clicked on sponsored company presentations. In various embodiments, the sponsored company analytics system 406 can present the same company to the same user a predetermined number of times or until the user clicks on the company to learn more. The sponsored company analytics system 406 can further terminate company bids that, for instance, meet a termination date or are being presented to users unsatisfactorily frequently or unsuccessfully. Additionally, the sponsored company analytics system 406 may be utilized to renew or extend company bids, such as at the direction of the company presenting entity or the social network administrator.

In various examples, a recommendation entity for a company can associate a monetary company bid with a company. In such an example, the recommendation engine 200 can incorporate the relative size of a company bid in the calculation relating to the presentation of a particular company to a particular user. Such monetary company bids can be in one or more currencies. The currencies may be normalized by up-to-date currency exchange rates for the purposes of determining the relative value of the bid.

In various alternative embodiments, the company bid can be non-monetary or can incorporate non-monetary elements. Such non-monetary elements can be promotional credits offered to a company posting entity by an administrator of the social network, can be services-in-kind with a supplier to the social network, and so forth. Such non-monetary elements can be assigned an equivalent monetary value for the purposes of calculating the relevance of a particular company to a particular user.

In various examples, the database 208 incorporates multiple company profiles, each of the company profiles individually corresponding to one company for which an entity that has a corresponding company on offer. The sponsored recommendation engine 400 is configured to determine an aggregate company score for at least some of the company profiles in the database 208 by incorporating a relevance of the company profiles to user characteristics using the recommendation engine 200 and a potential company bid corresponding to each company profile. Company profiles that do not incorporate a company bid may either not have their relevance score modified, or may be treated by the system 100 as a separate type of company profile in comparison with company profiles that have corresponding company bids.

In various examples, when a user accesses the social network, the sponsored recommendation engine 400 cross references the user's characteristics against some or all of the company profiles in the database 208. The recommendation engine 200 can generate a relevance for each of the cross referenced profiles. The sponsored recommendation engine 400 can utilize a processor 408 (in various examples, the processor 408 is the processor 112 of the system 100) can manipulate the relevance for the company profile by a corresponding company bid. In an example, the relevance for a company profile is multiplied by the company bid corresponding to the company profile. In various examples, any combining mechanism or process can be utilized to produce the aggregate job score.

In an illustrative example, if the recommendation engine 200 arrives at a relevance of 0.8 for user characteristics in comparison with a first company profile, and the first company profile has a bid of two (2) dollars, the aggregate company score for the first company is 1.6. If the recommendation engine 200 arrives at a relevance of 0.4 for user characteristics in comparison with a second company profile, and the second company profile has a bid of five (5) dollars, the aggregate company score for the second company is 2.0. The social network may then display information related to the second company ahead of information related to the first company on the user device 102 corresponding to the user.

In various examples, the relevance of a job profile to a user may also factor in previous success that the job posting has had with other users. If a large percentage of users who are presented with a job posting based on the job profile select the job posting for more information, then the job posting may be deemed more relevant. A so-called "click-through rate" that exceeds a threshold may result in the relevance of the job posting being increased, while a click-through rate less than a threshold may result in the relevance of the job posting being reduced.

Relatedly, the characteristics of other users of the social network who do select a job posting for more information can also be incorporated into determining the relevance for a particular user. Characteristics of users who have selected a particular job posting in the past can be compared against user characteristics of a prospective user. To the extent that user characteristics of a prospective user are or are not related to the user characteristics of users who have selected a job posting in the past, the relevance of the job posting may similarly be increased or decreased for a prospective user. As such, the server 104 may store characteristics of users who have selected the job posting in the past and may develop composite user characteristics. The degree to which the characteristics of a prospective user match the composite characteristics may weight the results of the recommendation engine more heavily for a given prospective user.

In various examples, companies with company bids (i.e., "sponsored companies") and that have the highest aggregate company score are always presented to the user more prominently than companies that do not have a corresponding company bid (i.e., "unsponsored companies"). In an example, only sponsored companies are presented to the user. In an example, the system 100 may present the user a predetermined number of sponsored companies with the sponsored companies having the highest aggregate company scores presented to the user in descending order. If there are not sufficient sponsored companies to meet the sponsored companies requirement then the unfulfilled sponsored companies quota may simply be unmet. Upon the presentation of the predetermined number of sponsored companies, unsponsored companies may then be presented to the user, such as according to the unsponsored companies determined relevance to the user.

In an alternative example, the unsponsored companies may be assigned the same aggregate company score as their relevance score and all sponsored and unsponsored companies presented to the user based on the comparative company scores. In such an example, if an unsponsored company has an aggregate company score of 1.0, while the highest aggregate company score for a sponsored company is 0.9, the unsponsored company may be presented to the user ahead of the sponsored company.

Figure 5:
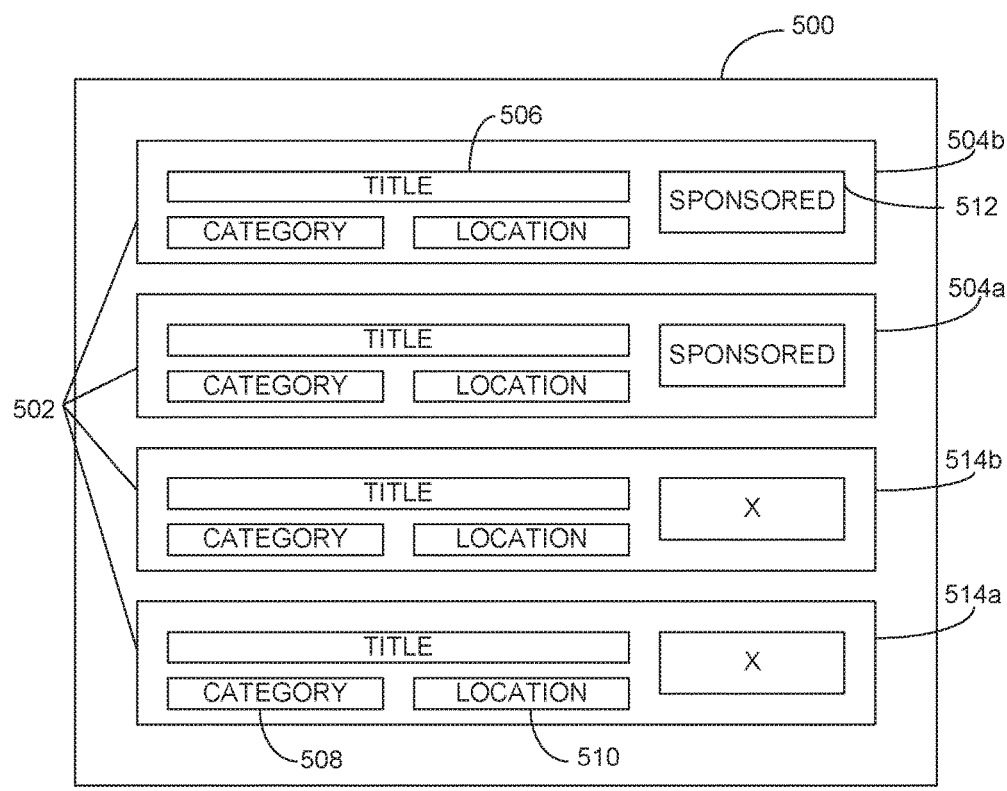
FIG. 5 is a depiction of a user interface screen that can be displayed by the social network on the user device.

FIG. 5 is a depiction of a user interface screen 500 that can be displayed by the social network on the user device 102 corresponding to a user. In an example, the user interface screen 500 is a sub-portion of a larger user interface screen displaying additional information related to the social network. Upon the sponsored recommendation engine 400 having identified sponsored and unsponsored companies to present to a user, the social network server 104 can transmit the companies to the user device 102, such as along with other social network information that is displayed on a user interface, such as a display screen, of the user device 102.

In the illustrated example, the user interface screen 500 includes a list 502 of sponsored and unsponsored companies. In various examples, the list 502 is an ordered list based on various criteria described herein. If the sponsored recommendation engine 400 did not identify any sponsored companies to present to the user, the user interface screen 500 may only present unsponsored companies. Depending on the aggregate company scores and the criteria for displaying the list 502, in certain examples only sponsored companies are presented on the list 502.

In an example noted above, sponsored companies 504a,b are displayed at the top of the list 502, i.e., most prominently on the list 502. In the above example, the sponsored company 504b corresponds to the second company profile that received an aggregate company score of 2.0 and is displayed most prominently at the top of the list 502, while company 504a corresponds to the first company profile that received an aggregate company score of 1.6 and is displayed below and less prominently on the list 502 than the first company 504b. In the illustrated example, the sponsored companies 504a,b include a company title 506, a company category 508, a company location 510, are marked "sponsored" in the label section 512.

In the illustrated example, unsponsored companies 514a,b are displayed less prominently than the sponsored companies 504a,b. In an illustrative example, the unsponsored company 514a corresponds to a relevance score of 0.9 and is displayed above of and more prominently than the unsponsored company 514b, which has a relevance score of 0.7. The unsponsored companies include the company title 506, the company category 508, the company location 510, and the label section 512. In various examples, unsponsored companies 514a,b do not incorporate a label section 512 or include a label section 512 with an indication that the company is unsponsored.

As noted above, various examples permit companies 504a,b and 514a,b to be displayed in various arrangements depending on the requirements of the social network. Thus, as noted above, the unsponsored companies may have their relevance scores converted into aggregate company scores and then all of the companies 504*a,b* and 514*a,b* positioned in the list 502 according to their aggregate company scores. In this way, unsponsored companies 514*a,b* may be presented more prominently than some sponsored companies 504*a,b*.

In various examples, the list 502 may not include any sponsored companies 504*a,b*, such as if no companies have been sponsored or if no sponsored companies exceed the relevance threshold for the user. In various examples, the list 502 may not include any unsponsored companies 514*a,b*, such as if the social network has been programmed to first present all sponsored companies 504*a,b* until space on the list 502 has been exhausted and only then begin displaying unsponsored companies.

Figure 6:
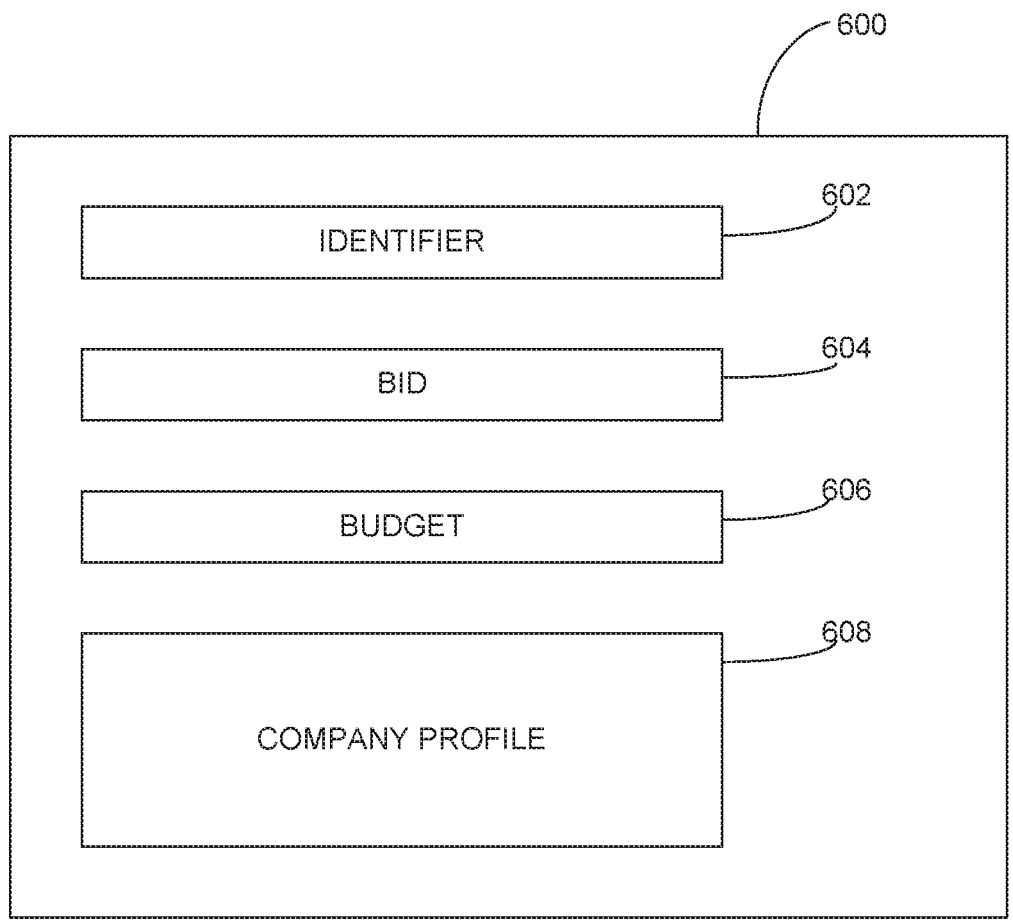
FIG. 6 is an illustration of an interface screen to create a campaign including a company bid for a company profile.

FIG. 6 is an illustration of an interface screen 600 to create a campaign including a company bid for a company profile. The interface screen 600 can be specifically adapted for use by customers, such as by companies that wish to post messages or advertisements, though the interface screen can be utilized by social network administrators or any other party for whom access to create or modify a campaign is granted. The interface screen 600 can be displayed on a web browser or other program or application for displaying and interfacing with information known in the art. The interface screen 600 can function as the company poster interface 402.

The interface screen 600 includes an identifier field 602 to enter an identifier, such as a name, for the campaign. The identifier may be descriptive of the campaign and/or may uniquely identify the campaign. The interface screen 600 further includes a bid field 604 in which a bid price or range of bid prices for an auction format can be entered. A budget field 606 can be utilized to limit either the number of company presentations or user selections will be paid for or a monetary limit for the campaign. A company profile field 608 can be utilized to upload company profile characteristics or select a company profile that has already been entered into the system 100. In various examples, a single campaign can include multiple company profiles, with each user selection of a company profile counting against the limitations for the campaign as a whole.

The interface screen 600 can be utilized to modify existing campaigns. Existing campaigns can be lengthened or shortened, have budgets and/or bids increased or decreased, and have company profiles added or removed from the campaign. Under certain business conditions, a company poster may be prevented from adjusting a campaign once a campaign has begun, in which case the interface screen 600 may reflect an inability to change campaign parameters. In various examples, an administrator of the social network may always be given access to modify a campaign.

Figure 7:
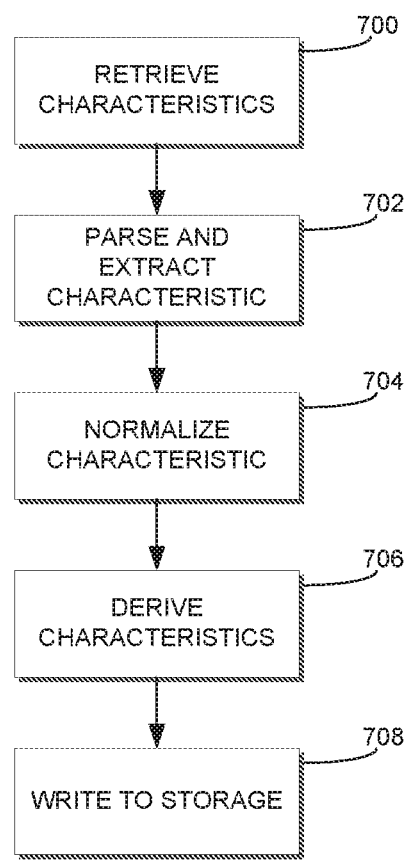
FIG. 7 is a flow diagram illustrating an example of the method operations involved in a method of pre-processing user profiles with a characteristic extraction engine.

FIG. 7 is a flow diagram illustrating an example of the method operations involved in a method of pre-processing user characteristics with a characteristic extraction engine to generate enhanced characteristics for use by a matching engine. In some examples, some of the method operations illustrated in FIG. 7 may be performed offline by means of a batch process that is performed periodically (e.g., two times a day, daily, weekly, and so forth), while in other examples, the method operations may be performed online and in real-time as requests for similar user characteristics and company profiles are being received and processed.

At 700, the relevant characteristics for a user or company profile are retrieved. In some examples, the characteristic extraction engine is configured to extract only certain characteristics from each user's characteristics information. Accordingly, the characteristic extraction engine may simply retrieve from a database the relevant data corresponding to the relevant characteristics. In some examples, the retrieval may be performing a database look-up or fetch of the relevant data.

At 702, as some profile characteristics may be free-form text (i.e., unstructured data), such as a description of a user's interest, skills, hobbies, career objectives, and so forth, some of the relevant characteristics that have been retrieved are parsed and extracted from their raw data format.

At 704, one or more processes may be performed to either normalize or standardize one or more profile characteristics. For instance, a user's job title may be standardized so that it can be more easily compared with others. Similarly, the name of a company that employees a user may be normalized, for example, to drop or add "Inc." or "Corporation" and so forth.

At 706, the characteristic extraction engine 300 may derive one or more characteristics from raw data included in a user's or company's profile. In some examples, one or more enhanced characteristics may be characteristics that are derived from the raw data included in a user's characteristics. If, for example, a user's characteristics indicates the year that he or she graduated from college, an enhanced characteristic that can be derived from this raw data may include the number of years of work experience after college. In addition, some characteristics may include data received from a data source external to the system 100. Accordingly, data from a user's profile (e.g., a name, or other identifying data) may be used to query an external data source for additional information about the user.

At 708, the relevant characteristics, including characteristics such as extracted characteristics, derived characteristics, normalized or standardized characteristics, or retrieved characteristics are written to storage as pre-processed, enhanced user characteristics.

Figure 8:
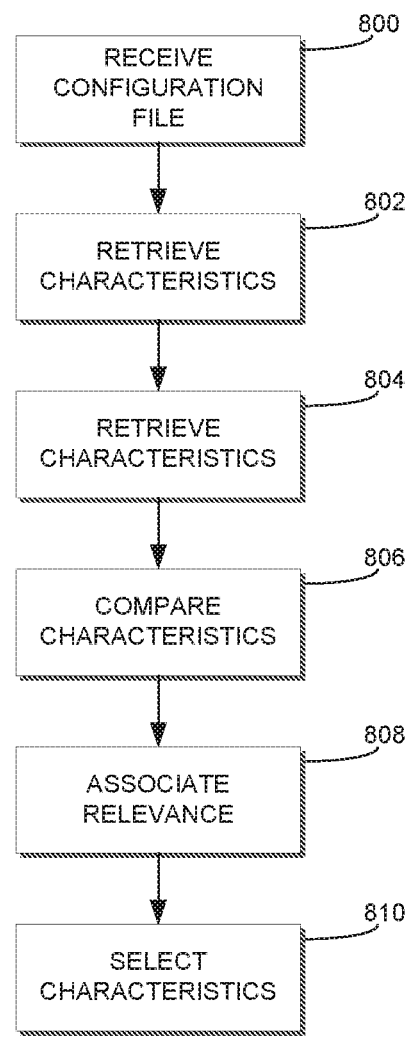
FIG. 8 is a flow diagram illustrating an example of the method operations involved in a method of generating a relevance between a user profile and a company profile.

FIG. 8 is a flow diagram illustrating an example of the method operations involved in a method of generating a relevance between user characteristics and a company profile with a matching engine 302.

At 800, the recommendation engine 200 receives, retrieves, or otherwise reads or processes a profile matching configuration file. The profile matching configuration file, which may be a document formatted in Extensible Mark-up Language (XML) or in some other format, specifies the particular characteristics (or data elements) that are to be extracted or retrieved from a particular recommendation entity, such as enhanced user characteristics. For example, in assessing the relevance of user characteristics to a company profile, the names of the person and the company may not play a role in determining the similarity of the profiles. As such, the profile matching configuration file may not include user's names as a characteristic to be extracted and compared. However, technical skills or professional organizations may be relevant to the analysis, and as such, these characteristics may be specified in the profile matching configuration file, such that the data representing these characteristics are ultimately retrieved and analyzed by the matching engine 302.

As discussed below, the profile matching configuration file specifies the particular characteristics to be retrieved as well as the particular matching algorithms to be used for each of the retrieved characteristics. For example, the profile matching configuration file indicates an algorithm or comparison operations that are to be performed for the various characteristics specified in the matching configuration file, and how the various similarity sub-scores, resulting from the comparison of individual characteristics, are to be combined to generate an overall relevance. In some instances, the matching configuration file may indicate that a particular comparison is to be performed for a particular characteristic that results in a match only when there is an exact match. In other instances, a partial match may be indicated, and so forth. In some instances, the comparison may involve determining whether a particular user characteristic is within a particular distance of the same company profile characteristic and so forth. As such, the matching profile may indicate not only the type of matching operation to be performed between a particular pair of characteristics, but also the weight that should be applied to any resulting sub-score generated as a result of a match occurring between two characteristics. In some examples, the weight applied to any particular sub-score may be dependent upon the extent to which two characteristics match, as specified by a matching algorithm or rule in the profile matching configuration file.

At 802, the relevant characteristics for one of the user characteristics and the company profile are retrieved. In some instances, the company profile may be selected by a user, while in other instances, an application or process selects a particular company profile. In any case, the relevant company profile characteristics for the selected company profile are those company profile characteristics specified in the profile matching configuration file obtained at 800. In some examples, each user and company profile may have an identifier (e.g., such as a user or company identifier, or, user or company profile identifier). Accordingly, a request to identify company profiles similar to user characteristics may include an identifier identifying the company profile. With this, the matching engine 302 can retrieve the necessary characteristics from the pre-processed, enhanced user or company profile for the particular user or company identified by the user or company identifier, as the case may be.

At 804, the matching engine retrieves the same set of characteristics for the other of the user characteristics or company profile not retrieved at 802. In some examples, the particular user or company profiles that are compared may be selected based on some required matching criteria, either by default, or as specified by an application, process or user who has initiated the request. For instance, the matching analysis may be limited to only those users or companies that share a particular characteristic in common with the profile selected in 802, such as having the same company title, or experience requirement. In other instances, the entire set of user characteristics or company profiles may be considered.

At 806, the matching engine 302 compares the various characteristics and calculates a relevance for the user characteristics and the company profile in accordance with the instructions or directives set forth in the profile matching configuration file. For instance, the profile matching configuration file indicates what comparison operation is to be performed for a pair of characteristics, and how the various similarity sub-scores are to be combined to derive the overall aggregate company score.

At 808, the relevance is associated with the user characteristics. The process of operation 806 may be repeated for additional company profiles, until all of a particular set of company profiles have been assigned relevance scores.

At 810, once all the company profiles have a relevance score, indicating a level of similarity to the user characteristics, a certain number of the company profiles with the highest aggregate company scores are selected for use with the sponsored recommendation engine 400. In some examples, the number of company profiles that are selected and provided for use with a requesting application may be determined using some default or predetermined number. Alternatively, in some examples, the number of user characteristics that are selected and provided to a particular requesting application may be configurable so that a certain number of the user characteristics with the highest relevance scores are provided. For example, in some examples, the profile matching configuration file specifies the number of user characteristics that are to be returned to the requesting application. The number of user characteristics may be specified explicitly (e.g., ten, thirty, one-hundred), or via a rule, such as, the top "X" number of user characteristics, or all user characteristics with a matching score exceeding "X", or some combination.

Figure 9:
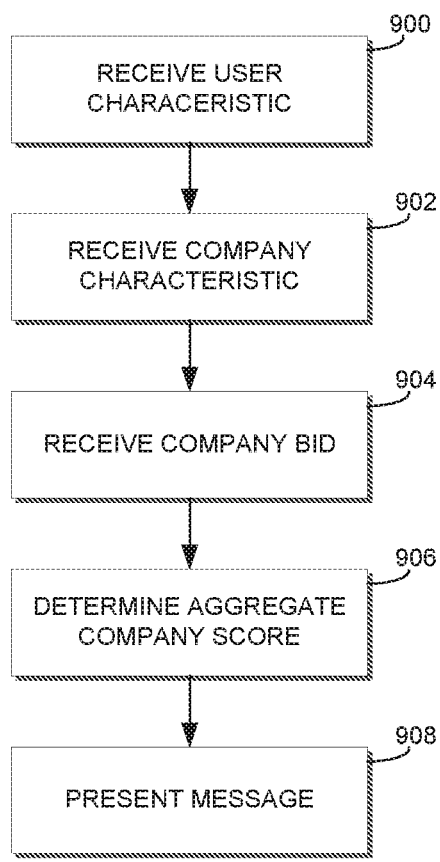
FIG. 9 is a flowchart for presenting a message relating to a company to a user based on an aggregate company score.

FIG. 9 is a flowchart for presenting a message relating to a company to a user based on an aggregate company score. The flowchart is discussed herein with respect to the system 100, but can be implemented on any suitable system.

At 900, a user characteristic is received by the processor 112. In various examples, multiple user characteristics are received by the processor 112. The user characteristic can be received via network interface 106, can be obtained from the electronic data storage 110 of the system 100, or can be received as input from a direct physical connection to the system 100, among other possible input methodologies known in the art.

At 902, a company characteristic of a company profile of a company is received by the processor 112. In various examples, multiple company characteristics of the company profile are received by the processor 112. The company characteristic can be received via the company poster interface 402, such as via the network interface 106, from the electronic data storage 110 of the system, or can be received as input from a direct physical connection to the system 100, among other possible input methodologies known in the art. In various examples, company characteristics from multiple company profiles can be received.

At 904, a company bid is received from an entity related to the company, such as a company posting entity that posted the company to the social network. In various examples, the company bid can include a monetary bid for a number of times a message related to the company is posted on a user device 102, a number of times a user selects or "clicks" on the message, an amount of money the company posting entity is willing to pay for each time a company message is presented, selected, or otherwise interacted with, a total amount of money the company posting entity is willing to pay, a duration of time the bid is active, and so forth as disclosed herein. In various examples, multiple company bids from multiple companies can be received. The number of company bids received, thereby denoting sponsored companies, can be less than the total number of company corresponding to the company profiles received at 902, with the companies not corresponding to company bids being unsponsored companies.

At 906, the processor 112 determines an aggregate company score for the user based on the relevance of the company characteristic to the user characteristic and the company bid. The relevance can be determined according to the methodology of FIG. 8 and as disclosed herein. Relevance can be determined as a percentage of matching ones of the user and company characteristics that comprise the user and company profiles, respectively. The aggregate company score can be arrived at by applying the bid to the relevance. In various examples, the relevance is multiplied by the bid to arrive at the aggregate company score. In various examples, an aggregate company score is obtained for each sponsored company. In various examples, only a relevance score is obtained for unsponsored companies. In various examples, both sponsored and unsponsored companies obtain an aggregate company score.

Figure 10:
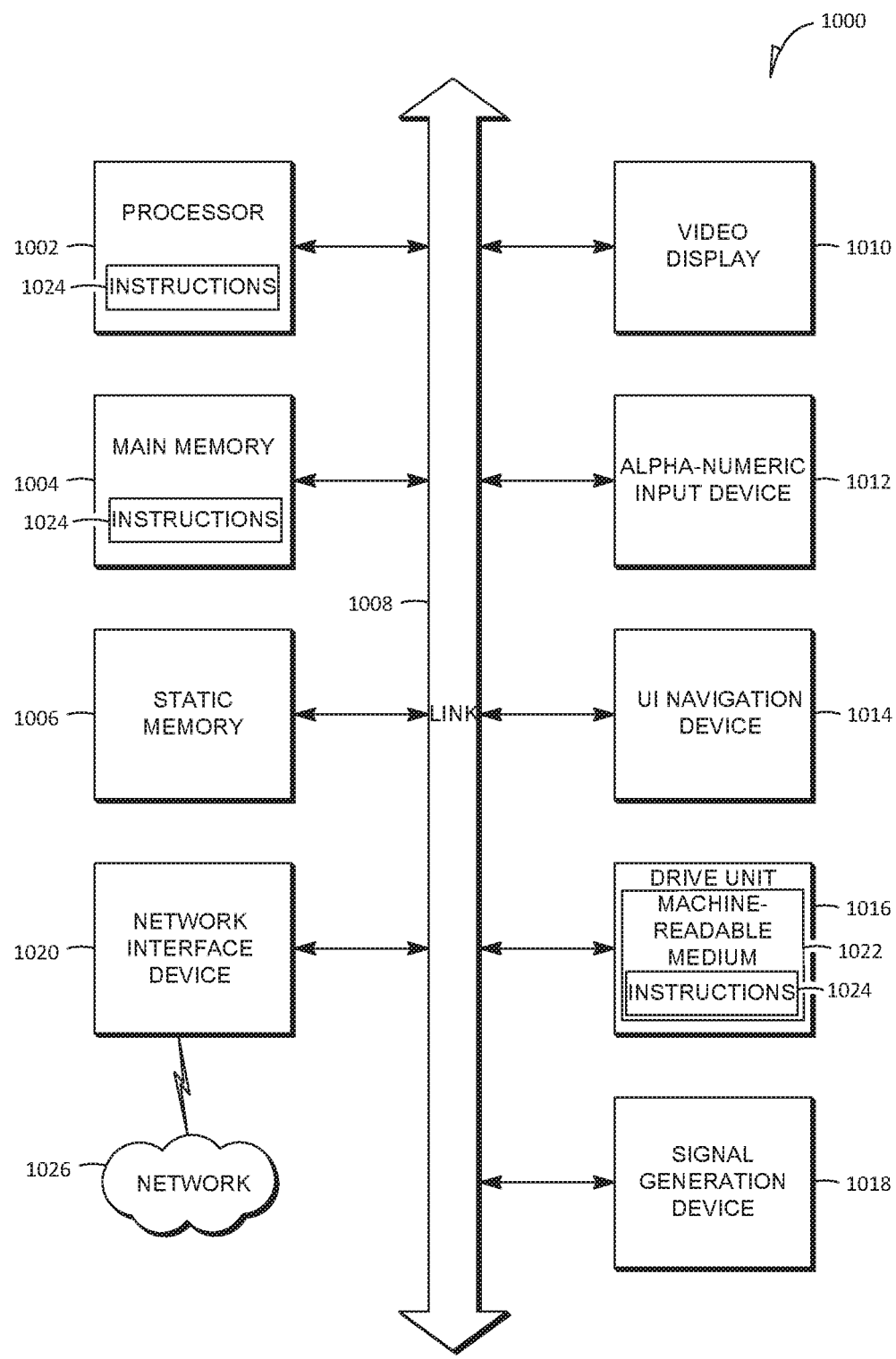
FIG. 10 is a block diagram illustrating components of a machine able to read instructions from a machine-readable medium.

At 908, a message relating to the company is presented to the user based, at least in part, on the aggregate company score. In various examples, the message is presented as illustrated on the interface screen 600. In various embodiments, the message includes an internet web link to further information. As shown on the interface screen 600, presentation of the message related to the company can be organized on the interface screen 600 as an ordered list according to whether the company is a sponsored company and which company has the largest aggregate company score. In various examples, multiple messages related to different companies are presented with respect to one another based on their respective aggregate company scores, such as by placing higher magnitude aggregate company scores relatively more prominently on the interface screen 600. FIG. 10 is a block diagram illustrating components of a machine 1000, according to some example examples, able to read instructions from a machine-readable medium (e.g., a machine-readable storage medium) and perform any one or more of the methodologies discussed herein. Specifically, FIG. 6 shows a diagrammatic representation of the machine 1000 in the example form of a computer system and within which instructions 1024 (e.g., software) for causing the machine 1000 to perform any one or more of the methodologies discussed herein may be executed. In alternative examples, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A memory device, the memory device communicatively coupled to a processor and comprising instructions which, when performed on the processor, cause the processor to perform operations comprising:
 receive a user characteristic of a user of an online social network, the user characteristic defining at least one of: a user profile characteristic of the user; an activity by the user on the online social network; and a social graph of the user on the online social network;

receive, from a company profile stored by the online social network, a company characteristic of a company associated with the social network;
receive a company bid corresponding to a cost incurred by an entity associated with the company;
determine a relevance score based upon the company characteristic and the user characteristic, the relevance score quantifying a relevance of the company to the user;
determine an aggregate company score for the user by combining the relevance score and the company bid; and
present a message related to the company to the user based, at least in part, on the aggregate company score.

2. The memory device of claim 1, wherein the memory device further comprises instructions that further cause the processor to:
receive a company characteristic of a company profile of each of a plurality of companies associated with the online social network;
receive a company bid for at least one of the plurality of companies posted to the online social network;
determine the aggregate score for each of the plurality of companies for the user based on:
the relevance of one of the plurality of company characteristics corresponding to each individual one of the plurality of companies; and
the company bid corresponding to the one of the one of the plurality of companies; and
present at least some of the plurality of companies to the user based, at least in part, on the respective aggregate score of each of the plurality of companies.

3. The memory device of claim 2, wherein the user characteristic is one of a plurality of user characteristics and at least one of the plurality of companies corresponds to a company profile that comprises a plurality of company characteristics, and wherein the aggregate company score is based on the relevance of the user characteristics to the company profile.

4. The memory device of claim 3, wherein the plurality of user characteristics include at least one of an age of the user, a gender of the user, a hobby of the user, an educational achievement of the user, a social network contact of the user, a location, a profile characteristic, a behavior characteristic, or a social graph characteristic of the user.

5. The memory device of claim 4, wherein the memory device further comprises instructions that further cause the processor to determine the relevance based on a percentage of ones of the plurality of company characteristics that match ones of the plurality of user characteristics.

6. The memory device of claim 2, wherein the memory device further comprises instructions that further cause the processor to present to the user the one of the plurality of companies corresponding to a largest one of the aggregate scores to a user relatively more prominently than other ones of the plurality of companies.

7. The memory device of claim 6, wherein the memory device further comprises instructions that further cause the processor to present to the user multiple ones of the plurality of companies to the user with relative prominence based on a magnitude of respective corresponding aggregate scores.

8. A system comprising:
a memory device communicatively coupled to a processor and comprising instructions which, when performed on the processor, cause the processor to perform operations comprising:
receive a user characteristic of a user of an online social network, the user characteristic defining at least one of: a user profile characteristic of the user; an activity by the user on the online social network; and a social graph of the user on the online social network;
receive, from a company profile stored by the online social network, a company characteristic of a company associated with the online social network; and
receive a company bid corresponding to a cost incurred by an entity associated with the company;
determine a relevance score based upon the company characteristic and the user characteristic, the relevance score quantifying a relevance of the company to the user;
determine an aggregate company score for the user by multiplying the relevance score and the company bid; and
present a message related to the company to the user based, at least in part, on the aggregate company score.

9. The system of claim 8:
wherein the instructions are further configured to cause the processor to:
receive a company characteristic of a company profile of each of a plurality of companies associated with the online social network; and
receive a company bid for at least some of the plurality of companies; and
determine the aggregate score for each of the plurality of companies for the user based on:
the relevance of one of the plurality of company characteristics corresponding to each individual one of the plurality of companies; and
the company bid corresponding to the one of the one of the plurality of companies; and
present one or more messages related to at least some of the plurality of companies to the user based, at least in part, on the respective aggregate score of each of the plurality of companies.

10. The system of claim 9, wherein the user characteristic is one of a plurality of user characteristics and at least one of the plurality of companies corresponds to a company profile that comprises a plurality of company characteristics, and wherein the aggregate company score is based on the relevance of the user characteristics to the company profile.

11. The system of claim 10, wherein the plurality of user characteristics include at least one of an age of the user, a gender of the user, a hobby of the user, an educational achievement of the user, a social network contact of the user, a location, a profile characteristic, a behavior characteristic, or a social graph characteristic of the user.

12. The system of claim 11 wherein the instructions are further configured to cause the processor to determine the relevance based on a percentage of ones of the plurality of company characteristics that match ones of the plurality of user characteristics.

13. The system of claim 9, wherein the instructions are further configured to cause the processor to present to the user the one of the plurality of companies corresponding to a largest one of the aggregate scores to a user relatively more prominently than other ones of the plurality of companies.

14. The system of claim 13, wherein the instructions are further configured to cause the processor to present to the user multiple ones of the plurality of companies to the user with relative prominence based on a magnitude of respective corresponding aggregate scores.

15. A method, comprising:

receiving, with a processor, a user characteristic of a user of an online social network, the user characteristic defining at least one of: a user profile characteristic of the user; an activity by the user on the online social network; and a social graph of the user on the online social network;

receiving, with the processor, from a company profile stored by the online social network, a company characteristic of a company associated with the online social network;

receiving, with the processor, a company bid corresponding to a cost incurred by an entity associated with the company;

determining, with the processor, a relevance score based upon the company characteristic and the user characteristic, the relevance score quantifying a relevance of the company to the user;

determining, with the processor, an aggregate company score for the user by multiplying the relevance score and the company bid; and causing, with the processor, a message related to the company to be presented to the user based, at least in part, on the aggregate company score.

16. The method of claim 15, wherein the memory device further comprises instructions that further cause the processor to:

receive a company characteristic of a company profile of each of a plurality of companies associated with the online social network;

receive a company bid for at least one of the plurality of companies posted to the online social network;

determine the aggregate score for each of the plurality of companies for the user based on:

the relevance of one of the plurality of company characteristics corresponding to each individual one of the plurality of companies; and the company bid corresponding to the one of the one of the plurality of companies; and present at least some of the plurality of companies to the user based, at least in part, on the respective aggregate score of each of the plurality of companies.

17. The method of claim 16, wherein the user characteristic is one of a plurality of user characteristics and at least one of the plurality of companies corresponds to a company profile that comprises a plurality of company characteristics, and wherein the aggregate company score is based on the relevance of the user characteristics to the company profile.

18. The method of claim 17, wherein the plurality of user characteristics include at least one of an age of the user, a gender of the user, a hobby of the user, an educational achievement of the user, a social network contact of the user, a location, a profile characteristic, a behavior characteristic, or a social graph characteristic of the user.

19. The method of claim 18 wherein the memory device further comprises instructions that further cause the processor to determine the relevance based on a percentage of ones of the plurality of company characteristics that match ones of the plurality of user characteristics.

20. The method of claim 16, wherein the memory device further comprises instructions that further cause the processor to present to the user the one of the plurality of companies corresponding to a largest one of the aggregate scores to a user relatively more prominently than other ones of the plurality of companies.

* * * * *

UNITED STATES PATENT AND TRADEMARK OFFICE
CERTIFICATE OF CORRECTION

PATENT NO. : 10,360,644 B2  
APPLICATION NO. : 15/848606  
DATED : July 23, 2019  
INVENTOR(S) : Posse et al.

Page 1 of 1

It is certified that error appears in the above-identified patent and that said Letters Patent is hereby corrected as shown below:

In the Claims

In Column 23, Line 8, in Claim 15, delete "processor;" and insert --processor,-- therefor Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*